United States Patent
Zugel

[11] 3,844,137
[45] Oct. 29, 1974

[54] FLEXIBLE COUPLING
[75] Inventor: Martin J. Zugel, Cleveland, Ohio
[73] Assignee: Cyclo Index Corporation, Cleveland, Ohio
[22] Filed: July 16, 1973
[21] Appl. No.: 379,384

[52] U.S. Cl. ............... 64/15 B, 64/27 B, 308/2 A, 403/313, 267/154
[51] Int. Cl. ............................................. F16d 3/52
[58] Field of Search....... 64/15 R, 15 B, 27 R, 27 B, 64/15 C; 308/2 A; 403/224, 225, 226, 312, 313; 267/154, 160

[56] References Cited
UNITED STATES PATENTS

| | | | |
|---|---|---|---|
| 1,557,958 | 10/1925 | Anderson | 64/15 B |
| 3,150,506 | 9/1964 | Alcaro | 64/15 B |
| 3,390,546 | 7/1968 | Jewell | 64/15 R |
| 3,554,589 | 1/1971 | Boggs | 403/313 |
| 3,664,202 | 5/1972 | Metzger | 267/154 |

FOREIGN PATENTS OR APPLICATIONS

| | | | |
|---|---|---|---|
| 6,408,413 | 7/1964 | Netherlands | 267/154 |

*Primary Examiner*—Samuel Scott
*Assistant Examiner*—Randall Heald
*Attorney, Agent, or Firm*—Donnelly, Maky, Renner & Otto

[57] ABSTRACT

Flexible coupling member includes a substantially rigid cylindrical body portion having a plurality of longitudinally-spaced overlapping slots therein transversely of its longitudinal axis. The slots are positioned to provide the body portion with a plurality of interconnected leaf springs, with alternate springs extending substantially perpendicular to the remaining springs.

9 Claims, 7 Drawing Figures

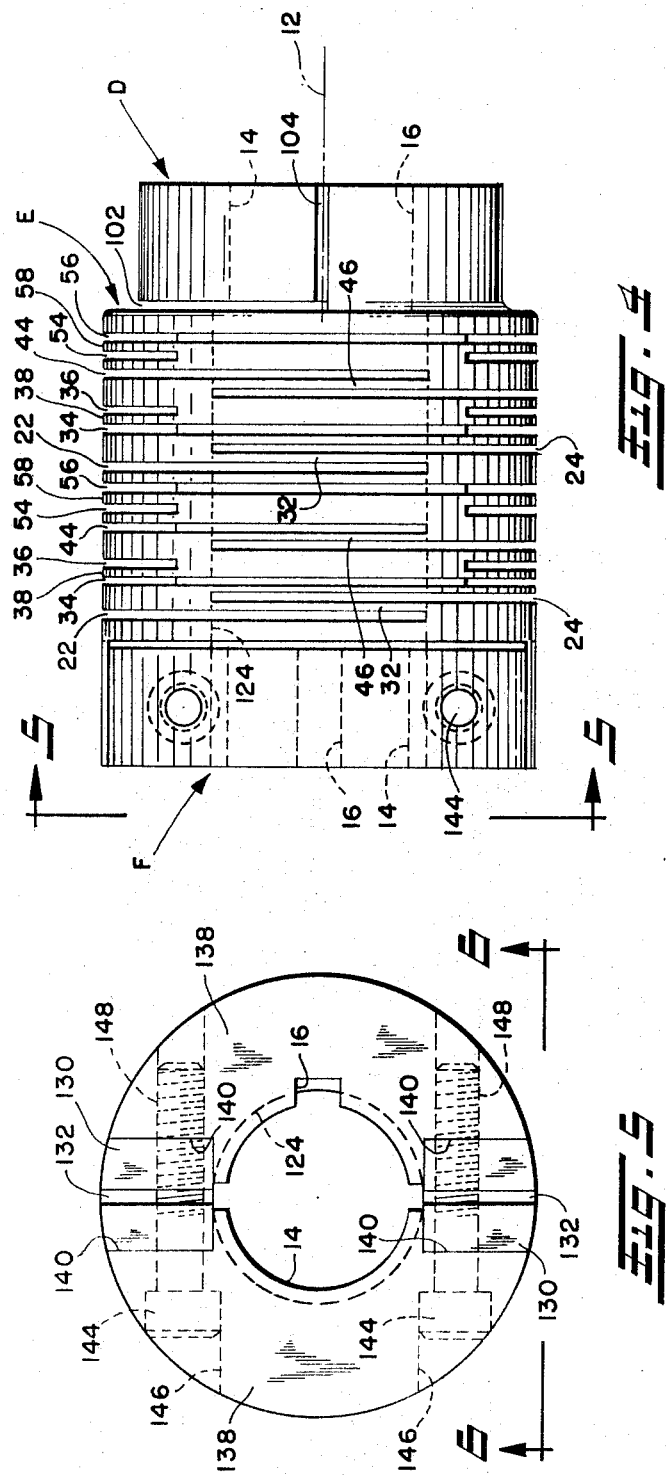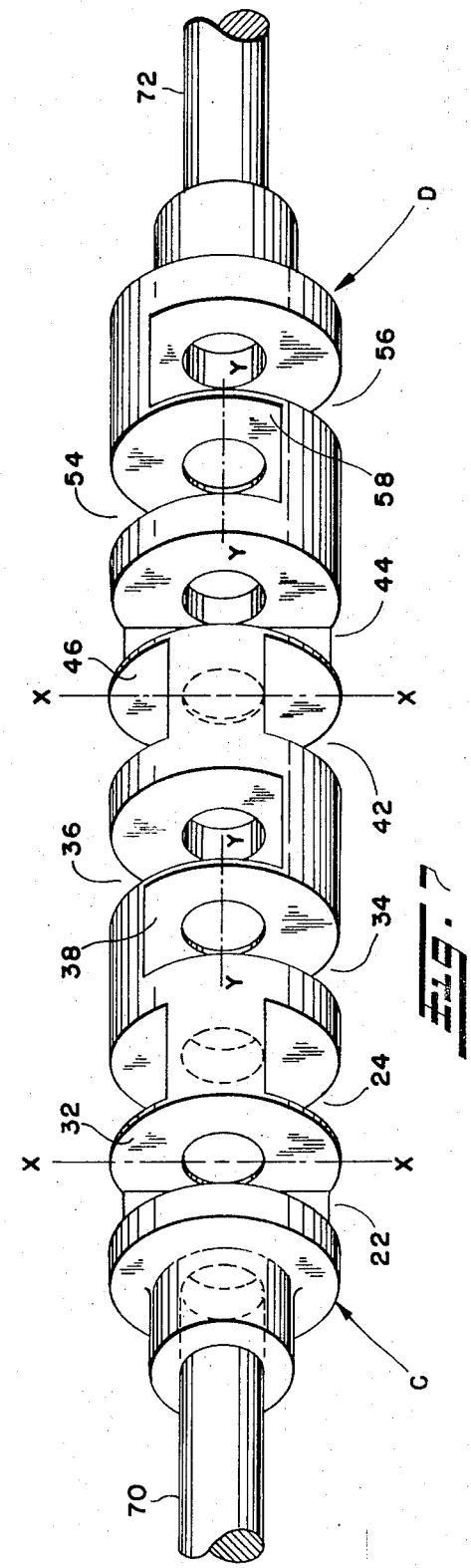

FLEXIBLE COUPLING

BACKGROUND OF THE INVENTION

This invention pertains to the art of couplings, and more particularly to flexible couplings for transmitting torque between a pair of shafts. The invention is particularly applicable to a flexible coupling of the type which will accommodate axial or radial misalignment between a pair of shafts and still be substantially rigid torsionally for efficient transfer of torque between the shafts.

Flexible coupling members of a known type include a substantially rigid cylindrical body portion having a longitudinal axis, opposite end portions, and a longitudinal bore therethrough. A plurality of longitudinally-spaced overlapping slots are formed in the body portion between its opposite end portions transversely of its longitudinal axis. The slots leave relatively thin sections of material providing spring action which allows the body portion to bend or flex in order to accommodate axial or radial misalignment between a pair of shafts secured to its opposite end portions.

Coupling members of the type described are disclosed in U.S. Pat. Nos. 1,557,958 to Anderson, issued Oct. 20, 1925, 3,071,941 to Alcaro, issued Jan. 8, 1963, and 3,390,546 to Jewell, issued July 2, 1968. In these coupling members, the slots are not cut in such a manner that optimum flexure of the body portion can occur to effectively accommodate both axial and radial misalignment between the shafts.

SUMMARY OF THE INVENTION

A flexible coupling member constructed in accordance with the present invention has a plurality of longitudinally-spaced overlapping slots in the body portion transversely of its longitudinal axis. The slots are positioned to provide the body portion with a plurality of interconnected leaf springs, with alternate leaf springs extending substantially perpendicular to the remaining leaf springs. With this arrangement, bending of the alternate leaf springs takes place on axes extending substantially perpendicular to the axes about which bending of the other leaf springs occurs.

In accordance with a preferred arrangement, the slots are cut in a non-repeating pattern for every four leaf springs. This makes it possible to effectively connect one end portion of the body member to one end portion of a first axially-aligned leaf spring and to an opposite end portion of the next axially-aligned leaf spring, thereby enhancing the ability of the coupling member to accommodate axial and radial misalignment, while maintaining a capability for transmitting high torque loads from one shaft to another.

Also in accordance with a preferred arrangement, the slots are cut in the body portion in opposed pairs. The first and second longitudinally spaced overlapping slots of each pair are angularly spaced from one another substantially 180°. The next pair of slots are angularly spaced substantially 90° relative to the first pair of slots and substantially 180° relative to one another. With this arrangement, the first pair of slots define a first leaf spring therebetween, while the second pair of slots define a second leaf spring extending substantially perpendicular to the first leaf spring.

In the preferred arrangement, the slots and springs are provided in a non-repeating set which defines four leaf springs. The body member may be provided with any desirable number of these sets of slots and springs.

With the foregoing in mind, it is a principal object of the present invention to provide an improved flexible coupling having enhanced ability to accommodate axial and radial misalignment between a pair of shafts.

Another object is to provide a flexible coupling member having optimum flexing action for accommodating axial and radial misalignment between a pair of shafts, while maintaining a capability to transmit high torque loads from one shaft to the other.

Other objects and advantages of the present invention will become apparent as the description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 4 is a side elevational view of a modified form of flexible coupling member constructed in accordance with the present invention;

FIG. 5 is an end elevational view looking generally in the direction of arrows 5—5 of FIG. 4;

FIG. 7 is a schematic perspective illustration showing the action of the improved flexible coupling member of the present invention.

DESCRIPTION OF THE PREFERRED EMBODIMENTS

Figure 1:
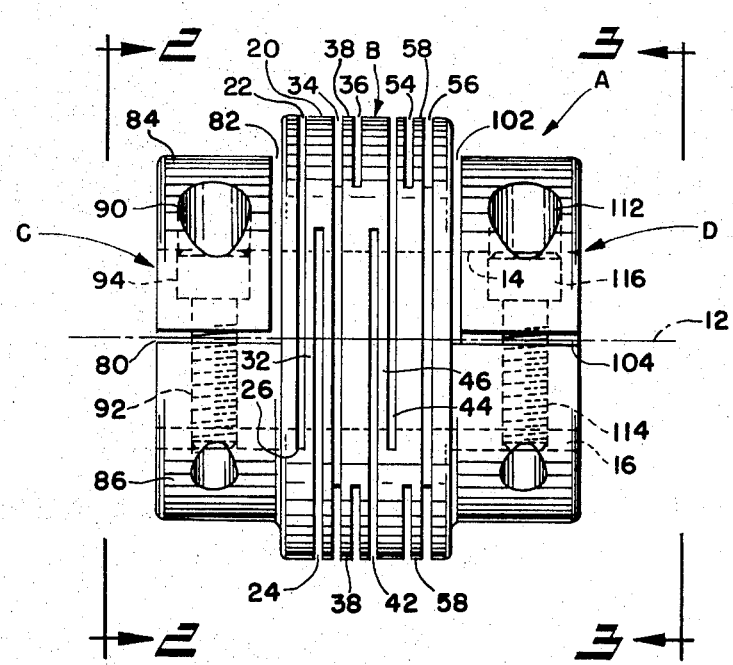
FIG. 1 is a side elevational view of a preferred form of flexible coupling member constructed in accordance with the present invention.

Referring now to the drawings, wherein the showings are for purposes of illustrating certain preferred embodiments of the invention only and not for purposes of limiting same, FIG. 1 shows an improved flexible coupling member A constructed in accordance with the present invention. Coupling member A is formed of substantially rigid material, such as steel or aluminum. However, it will be appreciated that coupling member A may also be formed from substantially rigid synthetic plastic material or reinforced plastic material.

Coupling member A includes a substantially cylindrical central body portion B having a central longitudinal axis 12, a longitudinal cylindrical bore 14, and opposite end portions C and D. Bore 14 may have a longitudinal keyway 16 formed therein for receiving a key on end portions of shafts adapted to be secured to end portions C and D.

Body portion B has a cylindrical peripheral wall 20 defined between its outer peripheral surface and the peripheral surface of bore 14 in which a plurality of longitudinally-spaced overlapping slots are formed. In one arrangement, a first pair of longitudinally-spaced overlapping slots are defined by first slot 22 positioned closest to end portion C, and second opposed slot 24 positioned further from end portion C. Slots 22 and 24 are angularly displaced substantially 180° relative to one another, and extend into peripheral wall 20 of body portion B completely across bore 14 and slightly into peripheral wall 20 at bottom slot ends 26 and 28. This first pair of slots 22 and 24 define leaf springs 32 therebetween formed by very thin longitudinal sections of peripheral wall 20 on opposite sides of bore 14.

A second pair of longitudinally-spaced overlapping slots 34 and 36 are formed in body member B, angularly spaced substantially 180° relative to one another, and angularly displaced substantially 90° relative to slots 22 and 24. Slots 34 and 36 define leaf springs 38 therebetween extending substantially perpendicular to first leaf springs 32 formed between slots 22 and 24.

A third pair of longitudinally-spaced slots 42 and 44 are formed in body member B, angularly spaced 180° relative to one another, and angularly aligned relative to slots 22 and 24. However, first slot 42 of this third pair of slots 42 and 44 is positioned closest to end portion C, and is angularly aligned with second slot 24 of first pair of slots 22 and 24. In other words, third pair of slots 42 and 44 are angularly aligned with first pair of slots 22 and 24 but are reversely positioned relative to the first pair of slots, and define leaf springs 46 therebetween in angular alignment with leaf springs 32.

A fourth pair of longitudinally-spaced overlapping slots 54 and 56 are formed in body portion B, angularly displaced relative to one another 180° and displaced substantially 90° with respect to third pair of slots 42 and 44. Fourth pair of slots 54 and 56 are also angularly aligned with second pair of slots 34 and 36, but first slot 54 of fourth pair of slots 54 and 56 positioned closest to end portion C is angularly aligned with second slot 36 of second pair of slots 34 and 36. In other words, fourth pair of slots 54 and 56 are simply reversed relative to second pair of slots 34 and 36. Fourth pair of slots 54 and 56 also define leaf springs 58 therebetween extending substantially parallel to leaf springs 38, and substantially perpendicular to leaf springs 32 and 46.

FIG. 7 schematically shows the spring action provided by making the slots in the above-described manner. The described slots form four longitudinally-spaced leaf springs 32, 38, 46 and 58. Leaf springs 32 and 46 are substantially in alignment with one another and bend about axes parallel to lines X—X. Leaf springs 38 and 58 are in substantial alignment with one another but extend substantially perpendicular to springs 32 and 46 so that bending occurs about axes extending substantially parallel to lines Y—Y. With such an arrangement, bending action is enhanced for accommodating axial and radial misalignment.

The described non-repetitive arrangement of making the slots also connects the opposite end portions of body portion B to alternate opposite ends of the leaf springs. For example, it will be recognized that each described leaf spring has opposite end portions. In the showing of FIG. 7, springs 32 and 46 may be considered as having right and left end portions, with the right end portions appearing closest to end portion D and the left end portions appearing closest to end portion C, while springs 38 and 58 may be considered to have top and bottom portions. As shown in FIG. 7, end portion C is effectively connected with one or a left end portion of leaf spring 32. However, the described non-repetitive arrangement of making the slots effectively connects end portion C with the opposite or right end portion of leaf spring 46. Likewise, end portion C is effectively connected with one end portion of leaf spring 38, while being effectively connected with the opposite end portion of leaf spring 58. The same is true for end portion D. As shown in FIG. 7, opposite end portion D is effectively connected with the top end portion of leaf spring 58, while being effectively connected with the bottom or opposite end portion of leaf spring 38. End portion D is also effectively connected with one or the left end portion of leaf spring 46, while being effectively connected with the right or opposite end portion of leaf spring 32. It has been found that this arrangement for connecting the opposite end portions of body portion B to opposite end portions of corresponding leaf springs enhances the bending action for effectively accommodating axial and radial misalignment, while maintaining an ability to transfer high torque loads.

Obviously, opposed shafts 70 and 72 are adapted to be connected with opposite end portions C and D. The longitudinal axes of shafts 70 and 72 may intersect one another at an angle instead of lying in a perfectly straight line, and such longitudinal axes may also be radially misaligned relative to one another. The described flexible coupling arrangement effectively accommodates such axial and radial misalignment, while maintaining the ability to transfer high torque loads, and relieving high stresses from bearings supporting shafts 70 and 72.

Figure 6:
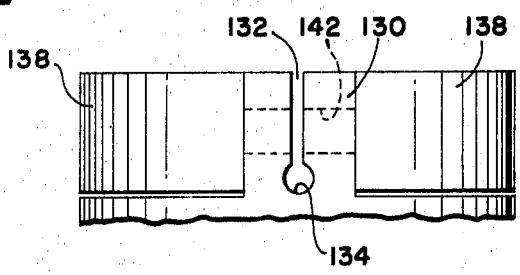
FIG. 6 is a bottom plan view looking generally in the direction of arrows 6—6 of FIG. 5.

With the arrangement described with respect to FIG. 1, it should be recognized that the four springs, and the slots defining such springs, form a non-repetitive set of slots and springs. More than one such set of slots and springs may be formed in a body portion of a flexible coupling member if so desired. An arrangement having two such sets of slots and springs is shown in FIGS. 4 through 6.

Figures 2, 3:
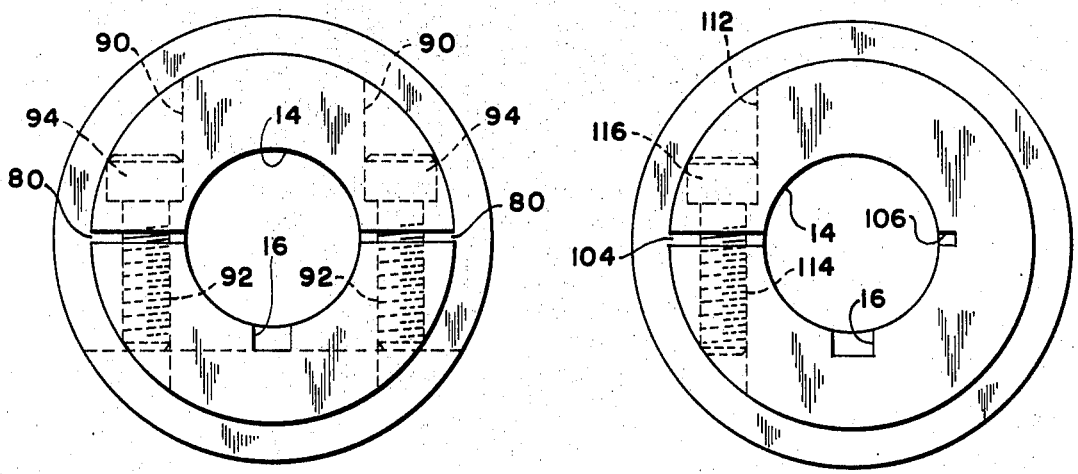
FIG. 2 is an end elevational view looking generally in the direction of arrows 2—2 of FIG. 1.
FIG. 3 is an end elevational view looking generally in the direction of arrows 3—3 of FIG. 1.

Obviously, many different arrangements may be provided for securing the opposite end portions of shafts 70 and 72 to end portions C and D. In the arrangement of FIG. 2, end portion C is longitudinally split at 80 on opposite sides of bore 14 to intersect a slot 82. This provides a somewhat inverted U-shaped portion 84 which is separable from body portion B, and an opposite generally U-shaped portion 86 integral with body portion B. Portion 84 may then be tapped as at 90, while portion 86 has threaded bores 92 therein. Bolts 94 may extend through holes 90 into threaded bores 92 for clamping portion 84 against portion 86 to secure an end portion of a shaft therebetween.

In accordance with another arrangement, a slot 102 may be formed between body portion B in opposite end portion D. A single longitudinally extending slot 104 may then be formed in end portion D on one side of bore 14 to intersect slot 102. A notch 106 may be formed in bore 14 opposite longitudinal slot 104. End portion D will then be operative somewhat in the manner of a C-ring for radial expansion and contraction by opening or closing longitudinal slot 104. An aligned hole 112 and threaded bore 114 on opposite sides of longitudinal slot 104 are adapted to receive a bolt 116 for closing longitudinal slot 104 and clamping an end portion of a shaft within bore 14 in end portion D.

In the arrangement of FIG. 4, substantially rigid cylindrical body portion E may have a somewhat enlarged bore 124 formed therethrough intersecting smaller shaft securing bore 14 in end portion D which has the same construction as described with respect to FIG. 3. Opposite end portion F of body portion E may have opposite longitudinally extending projections 130 thereon. Projections 130 are longitudinally slit as at 132 to intersect an enlarged hole 134 which simply allows projections 130 to flex by closing of slots 132. A pair of opposed arcuate members 138 have recesses 140 receiving projections 130. The interior surfaces of arcuate members 138 are formed to define bore 14. Projections 130 have holes 142 therethrough for receiving bolts 144 which extend through holes 146 in one of arcuate members 138 into threaded holes 148 in the other of arcuate members 138. Tightening of bolts 144 will move arcuate members 138 toward one another and close slots 132 in projections 130 for securely clamping an end portion of a shaft in bore 14. Obviously, many different arrangements involving set screws and the like may be provided for securing shafts to the opposite ends of the flexible coupling member.

In the arrangements described, all of the slots forming the leaf springs preferably extend substantially parallel to one another and substantially perpendicular to longitudinal axis 12 of the flexible coupling member. The width of the leaf springs parallel to longitudinal axis 12 may vary depending upon the strength of the metal used for making the coupling, and upon the size of the coupling itself. Obviously, for a very small coupling connecting two relatively small shafts transmitting low torque, the springs would be relatively thin. For an extremely large coupling for transmitting high torque between two relatively large shafts, the width of the springs would be proportionately larger.

End portion F of FIGS. 4-6 may be provided at both ends of a coupling member and has the advantage of enabling connection to various shaft sizes simply by providing arcuate members 138 with interior surfaces having various radii to define various diameter bores 14.

In the arrangement shown and described, each leaf spring is effectively cantilevered from one end connected to a shaft. For example, with reference to FIG. 7, spring 32 is cantilevered from one end effectively connected with shaft 70, and is cantilevered from its opposite end effectively connected with shaft 72.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A flexible coupling member comprising, a substantially rigid cylindrical member having a longitudinal axis, a longitudinal bore, a main body portion, opposite end portions and rotary shaft securing means for securing shaft end portions in said bore at said opposite end portions, a plurality of longitudinally-spaced opposed pairs of overlapping slots in said body portion transversely of said axis positioned to provide said body portion with a plurality of interconnected leaf springs, said opposed pairs of slots including a first pair of longitudinally-spaced slots angularly displaced substantially 180° apart to define a first leaf spring therebetween and including a first slot positioned closest to one of said opposite end portions and a second slot positioned further from said one opposite end portion, a second pair of longitudinally-spaced slots angularly displaced substantially 90° relative to said first pair of slots and substantially 180° relative to one another to define a second leaf spring therebetween extending substantially perpendicular to said first leaf spring, a third pair of slots defining a third leaf spring therebetween extending substantially parallel to said first leaf spring, said third pair of slots being in angular alignment with said first pair of slots and including a first slot positioned closest to said one opposite end portion in angular alignment with said second slot of said first pair of slots, said first and third leaf springs having opposite spring end portions substantially aligned axially of said body portion, and said one opposite end portion being effectively connected with one of said spring end portions on said first spring and with an opposite spring end portion on said third spring.

2. A flexible coupling member comprising a body member having a longitudinal axis and opposite body end portions for connection to rotatable shafts, a plurality of longitudinally-spaced overlapping slots in said body member transversely of said axis positioned to provide said body portion with a plurality of interconnected angularly aligned leaf springs having longitudinally aligned first spring end portions and longitudinally aligned opposite second end portions, at least certain of said springs having said first spring end portions thereof effectively connected to one of said body end portions and said second spring end portions thereof effectively connected to the other of said body end portions, at least certain other of said springs having said first spring end portions thereof effectively connected to said other body end portion and said second spring end portions thereof effectively connected to said one body end portion.

3. The coupling member of claim 2 wherein said plurality of leaf springs define a first plurality of leaf springs, and further including a second plurality of interconnected angularly aligned leaf springs extending substantially perpendicular to said first plurality of leaf springs, said second plurality of leaf springs having longitudinally aligned first spring end portions angularly displaced substantially 90° relative to said first spring end portions of said first plurality of springs and longitudinally aligned opposite second spring end portions angularly displaced substantially 90° relative to said second spring end portions of said first plurality of springs.

4. The coupling member of claim 1 wherein said second pair of slots includes a first slot positioned closest to said one opposite end portion and a second slot positioned further from said one opposite end portion, and further including a fourth pair of slots substantially angularly aligned with said second pair of slots, said fourth pair of slots including a first slot positioned closest to said one opposite end portion and angularly aligned with said second slot of said second pair of slots, said fourth pair of slots defining a fourth leaf spring therebetween extending substantially parallel to said second leaf spring, said second and fourth leaf springs having opposite spring end portions substantially aligned axially of said body portion, said one opposite end portion being effectively connected with one of said spring end portions on said second spring and with an opposite spring end portion on said fourth spring.

5. The coupling member of claim 4 wherein said slots and springs define a non-repeating set of slots and springs in said body portion, said body portion having more than one of said sets of slots and springs therein.

6. A flexible coupling member including a substantially cylindrical rigid body portion having a longitudinal axis, a longitudinal bore and opposite end portions, a plurality of longitudinally spaced overlapping pairs of slots in said body portion transversely of said axis defining a plurality of longitudinally spaced angularly aligned leaf springs, alternate pairs of said slots being reversely positioned so that said opposite end portions are effectively connected to one end portion of a first of said leaf springs and to an opposite end portion of a next of said leaf springs.

7. The coupling member of claim 6 wherein alternate pairs of said slots are angularly displaced substantially 90° relative to the other of said pairs of slots to define alternate leaf springs angularly displaced substantially 90° relative to said aligned leaf springs.

8. The coupling member of claim 7 wherein there are at least two of said alternate pairs of slots to define a pair of longitudinally spaced ones of said alternate leaf springs, said opposite end portions being effectively connected with one end portion of a first of said alternate leaf springs and with an opposite end portion of a next of said alternate leaf springs.

9. The coupling member of claim 3 wherein at least certain of said first spring end portions of said second plurality of springs are effectively connected to said one body end portion and said second spring end portions thereof are effectively connected to said other body end portion, at least certain other of said first spring end portions of said second plurality of springs being effectively connected to said other body end portion and said second spring end portions thereof being effectively connected to said one body end portion.

* * * * *